United States Patent Office 3,474,137
Patented Oct. 21, 1969

3,474,137
LIQUID PHASE OXIDATION OF XYLENES
Shiro Kudo, Sakai-shi, Kunio Shimomura, Ube-shi, and Takeshi Bamoto, Osaka, Japan, assignors to Kyowa Hakko Kogyo, Ltd., Tokyo, Japan, a corporation of Japan
No Drawing. Continuation-in-part of application Ser. No. 223,257, Sept. 12, 1962. This application Dec. 20, 1965, Ser. No. 515,152
Claims priority, application Japan, Apr. 28, 1962, 37/16,743
Int. Cl. C07c 51/18, 51/32, 51/00
U.S. Cl. 260—524          4 Claims

ABSTRACT OF THE DISCLOSURE

A process for the catalytic liquid phase oxidation of a xylene with molecular oxygen to simultaneously produce the corresponding phthalic acid and adipic acid which comprises reacting said xylene and molecular oxygen in the presence of an activator such as cyclohexanone at a temperature of about 20 to 100° C. and in the presence of a catalytically effective amount of a metal catalyst, for example a cobalt catalyst.

---

The present application is a continuation-in-part of copending application Ser. No. 223,257, filed Sept. 12, 1962, now abandoned.

The present invention relates to a process for producing phthalic acids in good yields by the oxidation of xylenes with oxygen. In particular, this invention relates to a process wherein cyclohexanone, cyclohexanol or a mixture thereof is used as a reaction promoter for the oxidation of xylene, thereby producing a good yield of phthalic acids and adipic acid while, at the same time, producing very little toluic acid.

In the known liquid phase oxidation of xylene with air (W. O. Lundberg, "Autoxidation and Antioxidants," 1961, Interscience Pub. Div., John Wiley & Sons, Inc.), it is relatively easy to oxidize one of the methyl groups. For example, toluic acid is produced from p-xylene under certain reaction conditions, e.g. atmospheric pressure and about 100°–150° C. However, it is very difficult to oxidize both methyl groups, and under such conditions, the conversion rate of p-xylene to terephthalic acid is only a few percent [cf. L. G. Manukovskaya et al., Zhur. Obshchei Kim. 29, 158 (1959); N. Ohta et al., J. Chem. Soc. Japan, Ind. Chem. Sec. 58, 798 (1955)]. For effective removal of hydrogen from the mthyl group of p-toluic acid, in order to have increased reaction velocity and degree of conversion, several processes have been suggested. These include Immhausen's process wherein oxidation is effected after deactivation of the carboxyl group by esterification and Scientific Design's process wherein a metallic ion catalyst is jointly used with bromine. Immhausen's process, which employs relatively moderate operation conditions, is disadvantageous in that it requires complicated procedures for its two-stage oxidation method and costs are high. Scientific Design's process advantageously allows a single stage oxidation method requiring a shorter period for operation, however, this process causes severe corrosion to the equipment due to intense reaction conditions (reaction temperature 230° C. and reaction pressure 30 atm.) and contamination of the terephthalic acid product due to the use of a bromine compound.

Another process for the oxidation of xylene is described in U.S. Patent 2,245,528 wherein xylene is oxidized, with molecular oxygen, at high temperatures in pressure using various initiators. However, this process, as in the process described supra, is not satisfactory because of the rather extreme reaction conditions and because of the great amount of toluic acid produced.

In order to have a satisfactory process for producing adipic acid and phthalic acids from xylene, the reaction conditions should be moderate, the amount of toluic acid produced in the reaction should be minimal, and the reaction should be conducted in a single stage.

The primary object of the present invention is the embodiment of a process which fulfills the enumerated desiderata, viz. moderate reaction conditions, a single stage reaction, and a very small production of toluic acid.

A further object of the invention is the embodiment of a process wherein both methyl groups of the xylene molecule are easily oxidized to the corresponding carboxyl groups.

Another object of the present invention is the embodiment of a process which proceeds smoothly and has a relatively high reaction velocity.

Briefly stated, the present invention essentially realizes the aforementioned objects by oxidizing xylene with molecular oxygen at a temperature of 100° C. or less, in the liquid phase while, at the same time, adding continuously cyclohexanone, cyclohexanol or a mixture of the two, as reaction promoters for the metallic catalyst used in the process.

The essence of the present invention is in the discovery that, at a temperature of 100° C. or less (e.g., 20° to 100° C.), the production of toluic acid can be minimized because inter alia the activity of the metal catalyst does not decrease as the reaction proceeds. Avoidance of deactivation of the catalyst is accomplished by adding, continuously, cyclohexanone, cyclohexanol, or a mixture of the two, to the reaction system. In addition, the use of cyclohexanone or cyclohexanol in the reaction produces adipic acid in rather good yields.

The amount of cyclohexanone or cyclohexanol used in the reaction is not particularly critical except that, preferably, they should be used in an amount of at least 0.01 mole per mole of xylene. Preferably, the amount of activator used is between 0.01 mole and 30 moles, per mole of xylene.

As pointed out above, the activator should be added continuously throughout the entire reaction. The particular amount added at a particular time is not critical. For example, the activator can be added in equal amounts throughout the entire reaction or, in the alternative, slightly more can be used at the beginning. Thus, at the start of the reaction between 0.01 mole and 20 moles, per mole of xylene can be added and, thereafter, between 0.05 mole and 10 moles can be added per hour, depending on the number of hours the reaction is conducted.

The starting material can be p-, o-, or m-xylene as well as mixtures thereof. The ratio of xylenes in the mixture is not critical as any mixture of xylene can be used.

The activator, viz., cyclohexanone, cyclohexanol, or a mixture of the two, can be introduced after the xylene, in the gaseous state, is mixed with oxygen. The activator may also be mixed with a solvent.

The reaction product, in addition to the acids already mentioned, consists of small amounts of other acids such as glutaric acid and succinic acid.

The following examples are presently preferred embodiments, and are for the purpose of illustration and are not to be considered as limitative.

EXAMPLE 1

10.6 grams (0.1 mole) of p-xylene, 2.5 grams (0.01 mole) of cobalt acetate tetrahydrate, 90 grams of propionic acid and 3.03 grams of cyclohexanone were charged into a hard-glass flask equipped with a gas inlet and outlet, a thermometer, and a stirrer. The mixture was heated to about 100° C. and oxygen was charged in the reaction mixture while stirring and the temperature maintained at 100° C. and at atmospheric pressure. 1.48 grams of cyclohexanone were added after one hour and another 1.48 grams of cyclohexanone were added the next hour. The yield calculated on the basis that 100 grams of p-xylene were used, was as follows: 129 grams of terephthalic acid, 16.0 grams of p-toluic acid, 55.5 grams of adipic acid, 12.4 grams of glutaric acid, and 2.5 grams of succinic acid.

EXAMPLE 2

In a manner similar to that of Example 1, 850 grams of propionic acid, as a solvent, 100 grams of p-xylene, 23.6 grams of cobalt acetate tetrahydrate, and 28.3 grams of cyclohexanone were heated to about 100° C. at atmospheric pressure. Molecular oxygen was then charged into the reaction mixture. Two hours after the molecular oxygen was added 35.4 grams of cyclohexanone were charged into the mixture at a rate of about 10 grams per hour for a period of four hours. The amount of p-xylene consumed was 100 grams and the amount of cyclohexanone consumed was 63.7 grams. The yield was as follows: 149 grams of terephthalic acid, 2.7 grams of p-toluic acid and 70.9 grams of adipic acid.

Having thus disclosed the invention what is claimed is:

1. A process for the catalytic liquid phase oxidation of a xylene selected from the group consisting of p-xylene, m-xylene, o-xylene and a mixture thereof, with molecular oxygen to produce the corresponding phthalic acid and adipic acid simultaneously, which comprises reacting said xylene and molecular oxygen, in the presence of from 0.01 to 30 moles, per mole of xylene, of an activator selected from the group consisting of cyclohexanone, cyclohexanol and a mixture thereof, at a temperature of from 20°–100° C. in the presence of a catalytically effective amount of a metal catalyst, said activator being added continuously to the oxidation reaction during the course of the oxidation.

2. A process according to claim 1, wherein the activator is used in an amount of 0.01–30 moles per mole of xylenes.

3. A process according to claim 1 wherein the activator is mixed with a solvent.

4. A process according to claim 1 wherein the metal catalyst is a cobalt catalyst.

References Cited

UNITED STATES PATENTS

| | | | |
|---|---|---|---|
| 2,005,183 | 6/1935 | Fleming et al. | 260—537 XR |
| 2,245,528 | 6/1941 | Loder | 260—524 |
| 2,851,496 | 9/1958 | Cates et al. | 260—537 XR |

LORRAINE A. WEINBERGER, Primary Examiner

R. WEISSBERG, Assistant Examiner

U.S. Cl. X.R.

260—531, 537